(12) United States Patent
McKnight et al.

(10) Patent No.: US 7,062,828 B2
(45) Date of Patent: Jun. 20, 2006

(54) CAB TO FRAME ALIGNMENT TOOL

(75) Inventors: Kory McKnight, Ballwin, MO (US);
Martin G Morse, Eureka, MO (US);
Robert Costew, Ballwin, MO (US);
Brian Wolf, Wildwood, MO (US);
Douglas C Akin, Waterloo, IL (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 14 days.

(21) Appl. No.: 10/778,800

(22) Filed: Feb. 12, 2004

(65) Prior Publication Data

US 2005/0177987 A1    Aug. 18, 2005

(51) Int. Cl.
*B23P 19/04* (2006.01)

(52) U.S. Cl. .......................................... 29/252

(58) Field of Classification Search ................ 29/252, 29/255, 239, 281.1; 254/95; 269/21
See application file for complete search history.

(56) References Cited

U.S. PATENT DOCUMENTS

| 5,971,362 A | 10/1999 | Clark ......................... 254/100 |
| 6,039,371 A | 3/2000 | Smith .......................... 294/8.6 |
| 6,101,702 A | 8/2000 | Claycomb et al. .......... 29/426.4 |
| 6,247,216 B1 | 6/2001 | Rader, Jr. ..................... 29/252 |
| 6,543,117 B1 | 4/2003 | Claycomb et al. .......... 29/426.4 |
| 2003/0131460 A1 | 7/2003 | Burns et al. .................. 29/252 |

*Primary Examiner*—Lee D Wilson
(74) *Attorney, Agent, or Firm*—Ralph E. Smith

(57) ABSTRACT

A cab-to-frame alignment tool positions a cab on a vehicle frame in alignment with a box rearwardly of the cab. The alignment tool has a tool body. A holder removably secures the tool body to the vehicle frame. A contact member is carried by the tool body. A driver advances the contact member a predetermined distance into engagement with a contact point on the cab to laterally locate the cab on the frame.

10 Claims, 3 Drawing Sheets

CAB TO FRAME ALIGNMENT TOOL

FIELD OF THE INVENTION

The present invention relates generally to alignment tools, and more particularly to an alignment tool for positioning a cab of a vehicle in alignment with a cargo-carrying box or bed at the rear of the cab.

BACKGROUND OF THE INVENTION

Cross car alignment of the cab of a truck or similar vehicle to the box has been a continuing problem, with the cab often being out of a flush relationship with the box by as much as 11 mm. Efforts to eliminate or at least minimize the problem have not been successful and have met with understandable customer dissatisfaction. Non-alignment of the cab and the box is not only unsightly but can also result in a build up of dirt along the sides of the vehicle between rear of the cab and the front of the box.

SUMMARY OF THE INVENTION

In accordance with the present invention a cab-to-frame alignment tool has been developed for positioning the cab of a vehicle in alignment with the box.

The alignment tool has a tool body provided with a device or holder for securing it to the frame of the vehicle. A contact member carried by the tool body is advanced a predetermined distance into engagement with a contact point on the cab to laterally locate the cab on the frame. The thickness of the contact member determines the lateral positioning of the cab. Two such tools may be employed, one to locate on the left side sill of the cab and the other to locate on the right side sill.

Preferably the holder for securing the tool body on the frame comprises a suction cup, with a vacuum producing means for evacuating the suction cup.

In the embodiment about to be described, a driver for advancing the contact member comprises a piston reciprocable in a cylinder, and a rod extending from the piston through an end wall of the cylinder. Preferably the contact member is threaded onto the rod so that the contact member may be replaced by one of a different thickness, if desired.

One object of this invention is to provide a tool for positioning a cab on a vehicle frame in alignment with the box having the foregoing features and capabilities.

Another object is to provide an alignment tool which is rugged and durable in use, and is well suited to the accomplishment of its intended function.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

Figure 1:
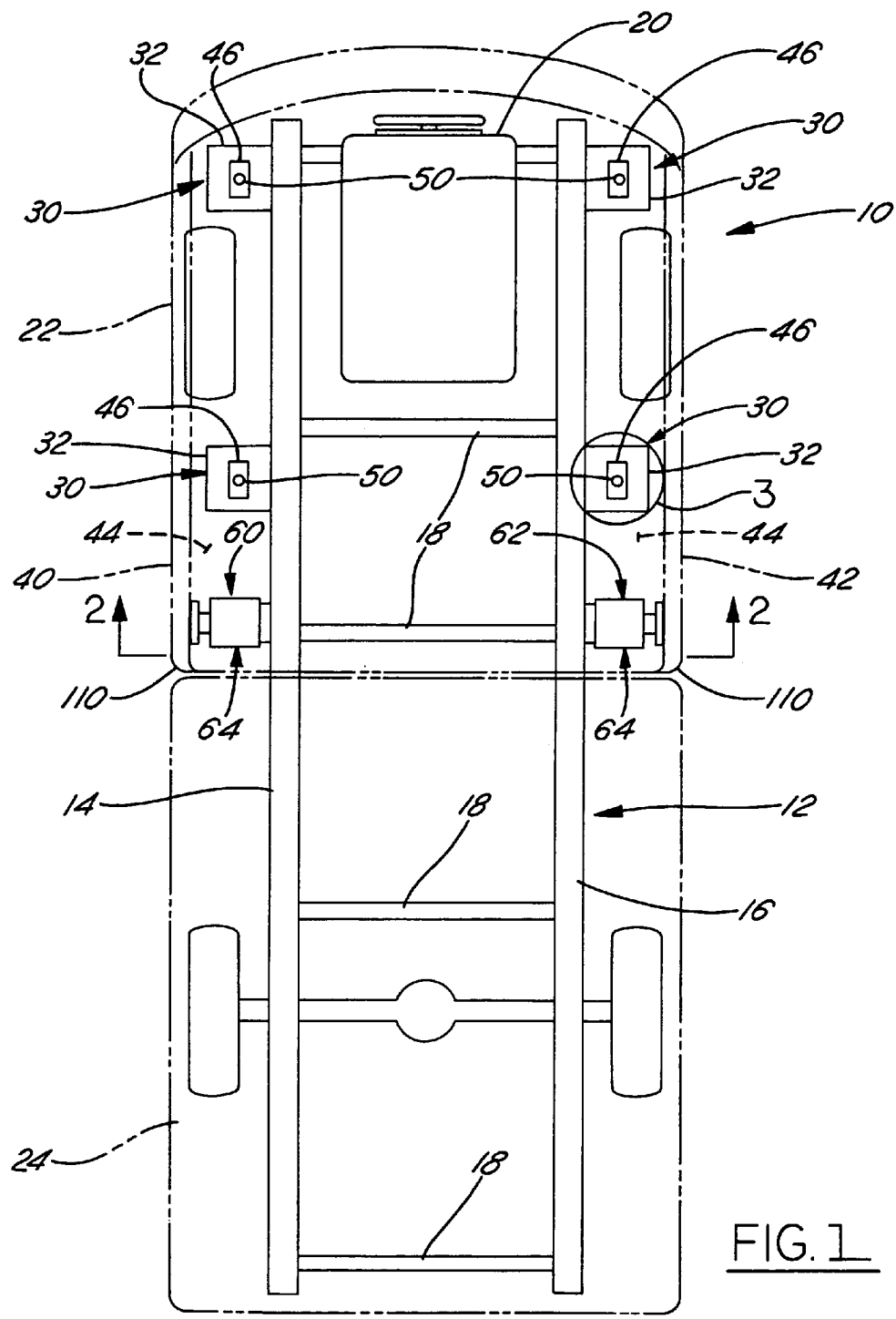
FIG. 1 is a plan view showing a cab and a box in broken lines mounted on a frame of a vehicle and also showing two of the alignment tools of this invention secured to the frame and locating on the side sills of the cab.

The following description of the preferred embodiment is merely exemplary in nature and is in no way intended to limit the invention, its application, or uses.

Referring now more particularly to the drawings, a vehicle 10 includes a chassis frame 12 having laterally spaced, longitudinally extending side frame bars 14 and 16 rigidly connected by cross bars 18. Shown in broken lines are a vehicle engine 20, a cab 22 and a box 24. Both the cab 22 and the box 24 are mounted on the frame, with the box to the rear and in general alignment with the cab.

Figure 3:
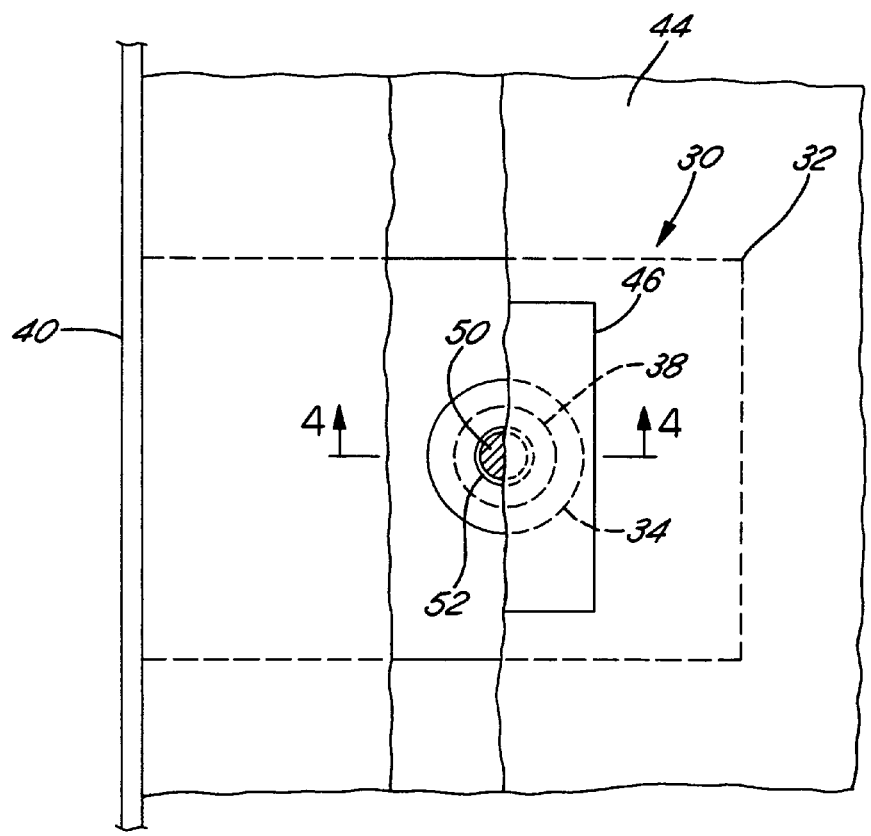
FIG. 3 is an enlargement of a portion of the structure in FIG. 1, within the circle 3.
Figure 4:
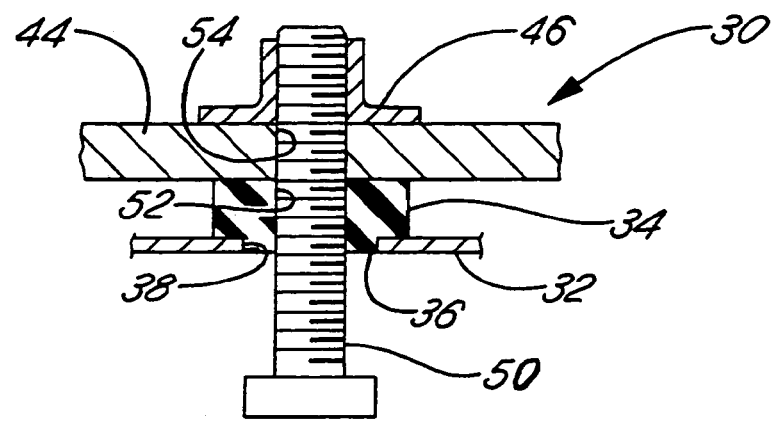
FIG. 4 is a sectional view taken on the line 4—4 in FIG. 3.

The box 24 is mounted on the frame 12 by any suitable means, not shown. The cab 22 is mounted on the frame 12 by several fastener assemblies 30. As shown in FIG. 1, there are at least two such fastener assemblies 30 on each side of the frame 12. Each fastener assembly 30 includes a flange 32 secured to and extending laterally outwardly from one of the frame bars 14, 16. A rubber bumper 34 on the top surface of each flange 32 has an integral projection 36 that extends through a hole 38 in the flange (see FIGS. 3 and 4). The cab 22 has side sills 40 and 42, and the side sills have bottom walls 44 that are supported on the bumpers. A tapping plate 46 is affixed to the top surface of the bottom wall 44 of each side sill. A bolt 50 of each fastener assembly 30 extends upwardly through a hole 52 in one of the bumpers 34, through a hole 54 in the bottom wall 44 of one of the side sills, and threads into one of the tapping plates 46 to fasten the side sills to a flange 32 of the frame 12. The holes 52 in the bumpers are oversized relative to the bolts 50 to allow for a small amount of lateral adjustment, on the order of a few millimeters, of the cab 22 relative to the box 24 which will become more apparent from the description to follow.

Figure 2:
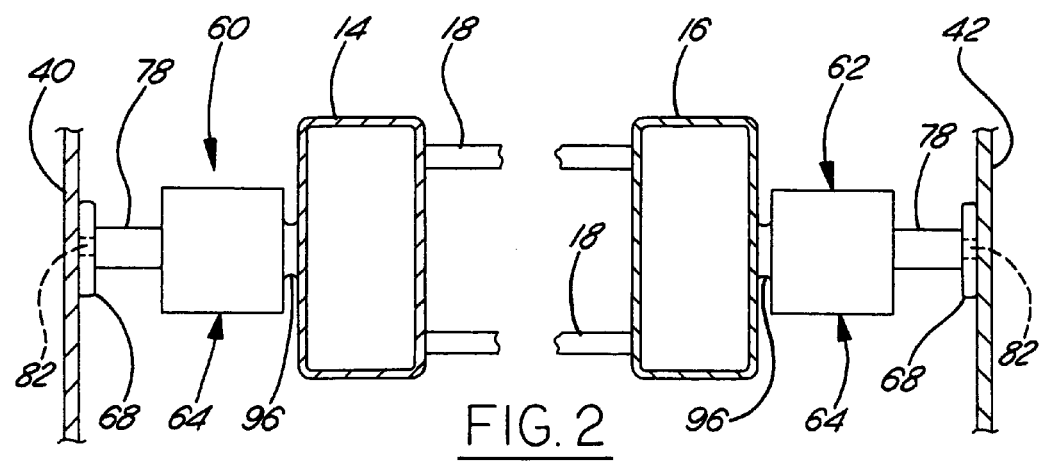
FIG. 2 is a sectional view taken on the line 2—2 in FIG. 1.
Figure 5:
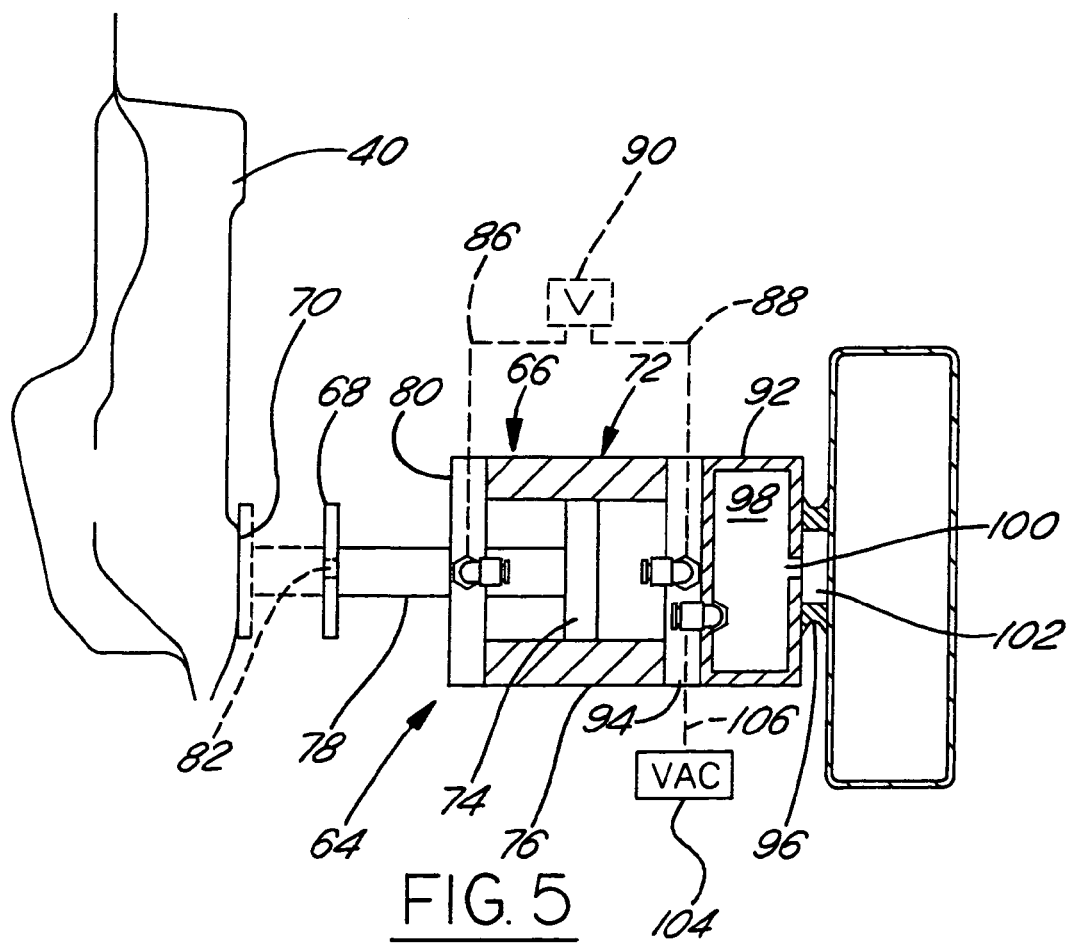
FIG. 5 is a view, with parts in section, of one of the alignment tools.

Referring to FIGS. 1 and 2, there are shown two alignment tools 60 and 62 which are identical in construction. FIG. 5 is an enlarged view of the alignment tool 60.

As shown in FIG. 5, the alignment tool 60 comprises a tool body 64 having a driver 66 for advancing a contact member 68 into contact with a contact point 70 on the side sill 40 of the cab. The driver 66 comprises a piston—cylinder assembly 72 having a piston 74 reciprocable in a cylinder 76. A piston rod 78 is secured to the piston and extends through an end wall 80 of the cylinder 76. A threaded pin 82 extends from the free end of the rod 78. The contact member 68 is detachable and is in the form of a flat, circular pad threaded on the pin 82. When the piston is advanced a predetermined distance into abutment with the end wall 80 of the cylinder 76, the pad 68 on the free end of the piston rod 78 abuts the contact point 70 on the side sill 40 as shown in broken lines in FIG. 5. The piston 74 is reciprocated in the cylinder 76 by fluid pressure from a source (not shown) through lines 86 and 88 under the control of a valve 90. When the valve is positioned so that fluid pressure is introduced to the cylinder 76 at the rod side of the piston 74, the cylinder at the head end of the piston is evacuated and the pad 68 is retracted. When the valve is shifted to pressurize the cylinder at the head end of the piston and evacuate the rod side of the piston, the pad is advanced to the broken line position in FIG. 5 into abutment with the contact point 70 on the side sill 40.

The tool body 64 has a vacuum canister 92 secured to the wall 94 of the cylinder 76 at the head end of the piston 74. A suction cup 96 is secured to the canister 92. The canister 92 has a chamber 98, and a port 100 in the canister 92 communicates the chamber 98 with the hollow 102 in the suction cup. A vacuum source 104 is connected by a line 106 to the chamber of the canister to evacuate the chamber and apply suction to the suction cup 96.

The alignment tool 62 is exactly like the alignment tool 60 and accordingly the parts of the tool 62 have been given the same reference numbers as corresponding parts of the tool 60.

In use, at least one of the tools 60, 62 is applied by suction to one of the frame bars 14, 16 and the piston 74 of the tool is fully extended as in broken lines in FIG. 5. The cab 22 is laterally shifted to a position such that the pad 68 engages the contact point 70 on the side sill 40 of the cab 22 when the piston is fully extended. If any correction in the lateral positioning of the cab is necessary, the adjustment can be accomplished by replacing the pad 68 with a pad of greater or lesser thickness. The cab 22 should be laterally positioned so that the sides of the cab at the rear corners 110 of the cab are substantially flush with the front corners of the previously mounted box 24. After the cab is properly laterally adjusted, it is secured to the frame 12 by the fastener assemblies 30.

If desired, both tools 60 and 62 may be employed to laterally position the cab 22, as shown in FIGS. 1 and 2.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A cab-to-frame alignment tool for positioning a cab on a vehicle frame in alignment with a box rearwardly of the cab, said alignment tool comprising:

a tool body, a holder for removably securing the tool body at a mounting location of the vehicle frame and along a first axis such that the tool body is substantially horizontal;

a vacuum source in fluid communication with said holder to selectively evacuate said holder and attach said holder to said vehicle frame;

a contact member carried by the tool body, and a driver for advancing the contact member a predetermined distance along the first axis, away from the mounting location, and into engagement with a contact point on the cab to laterally locate the cab on the frame.

2. The cab-to-frame alignment tool of claim 1, wherein said holder comprises a suction cup.

3. The cab-to-frame alignment tool of claim 2, wherein said suction cup is mounted on a wall of the tool body.

4. The cab-to-frame alignment tool of claim 1, wherein said driver comprises a piston—cylinder assembly on said tool body.

5. The cab-to-frame alignment tool of claim 4, wherein said piston—cylinder assembly comprises a piston reciprocable in a cylinder, and a rod extending from the piston through an end wall of the cylinder, said contact member being secured to the rod.

6. The cab-to-frame alignment tool of claim 5, wherein said contact member is secured on said rod by a detachable connection.

7. The cab-to-frame alignment tool of claim 6, wherein said detachable connection comprises a screw on the rod threaded into the contact member.

8. The cab-to-frame alignment tool of claim 1, wherein said tool body defines a first chamber for selectively advancing said driver and a second chamber in fluid communication with said vacuum source.

9. The cab-to-frame alignment tool of claim 8, wherein said second chamber is in fluid communication with said holder.

10. The cab-to-frame alignment tool of claim 8, wherein said first chamber is adjacent to said second chamber.

* * * * *